United States Patent [19]
Akinpelu et al.

[11] Patent Number: 5,661,792
[45] Date of Patent: Aug. 26, 1997

[54] COMPLETING TELECOMMUNICATIONS CALLS IN A COMPETITIVE LOCAL AND TOLL ENVIROMENT

[75] Inventors: Akinwale Ademola Akinpelu, Leonardo; Promod Kumar Bhagat, Morganville, both of N.J.; Dana Lee Garoutte, Wheaton, Ill.; Anthony Hatalla, Clinton, N.J.; Robert Bruce Hirsch, Whippany, N.J.; Ali H. Krisht, Ocean, N.J.; Chiu-Kai Lee, Holmdel, N.J.; James Benford Shepard, Pickerington, Ohio; Dorothy V. Stanley, Warrenville, Ill.; Theodore Louis Stern, Suffern, N.Y.

[73] Assignee: AT&T, Middletown, N.J.

[21] Appl. No.: 410,585

[22] Filed: Mar. 27, 1995

Related U.S. Application Data

[63] Continuation-in-part of Ser. No. 324,825, Oct. 18, 1994, abandoned.

[51] Int. Cl.⁶ .................................................. H04M 3/00
[52] U.S. Cl. ........................... 379/221; 379/220; 379/207
[58] Field of Search .................................. 379/220, 221, 379/201, 207, 112, 114, 120, 230, 210, 211, 212

[56] References Cited

U.S. PATENT DOCUMENTS

| | | | |
|---|---|---|---|
| 4,565,903 | 1/1986 | Riley | 379/221 |
| 4,577,066 | 3/1986 | Bimonte et al. | 379/221 |
| 4,754,479 | 6/1988 | Bicknell et al. | 379/207 |
| 4,791,665 | 12/1988 | Bogart et al. | 379/221 |
| 4,866,763 | 9/1989 | Cooper et al. | 379/221 |
| 5,237,604 | 8/1993 | Ryan | 379/220 |
| 5,255,315 | 10/1993 | Bushnell | 379/221 |
| 5,311,572 | 5/1994 | Friedes et al. | 379/67 |
| 5,311,585 | 5/1994 | Armstrong et al. | 379/221 |
| 5,341,415 | 8/1994 | Baran | 379/201 |
| 5,406,620 | 4/1995 | Pei | 379/221 |
| 5,440,626 | 8/1995 | Boyle et al. | 379/230 |
| 5,454,034 | 9/1995 | Martin | 379/230 |
| 5,475,749 | 12/1995 | Akinplu et al. | 379/221 |

OTHER PUBLICATIONS

Presentation to standards group, INC Number Portability Workshop, "A Location Routing Number for Number Portability", Dec. 15, 1994, 5 pages.

Presentation to standards group, Number Portability Workshop, "Contributions–INC #4", Mar. 3, 1994, 5 pages.

*Primary Examiner*—Ahmad F. Matar
*Attorney, Agent, or Firm*—Stephen M. Gurey

[57] ABSTRACT

In an environment of competitive local and interexchange carriers, offering number portability between local carriers-serving a common region and between switches serving that region, each local carrier accesses a regional database to determine the identity of the carrier and switch serving a local customer. In addition, interexchange carriers access a national database to determine the identity of the carrier and switch serving the customer specified by the number dialed by an originating customer. For customers requiring high reliability service, alternate carriers can be used to serve such customers in case the primary carrier is unavailable; the databases identify these alternate carriers. Advantageously, this arrangement allows a high degree of freedom of movement of customers between carriers and geographic relocation without requiring a number change.

18 Claims, 8 Drawing Sheets

COMPLETING TELECOMMUNICATIONS CALLS IN A COMPETITIVE LOCAL AND TOLL ENVIROMENT

This application is a continuation-in-part of application Ser. No. 08/324825, filed on Oct. 18, 1994 (now abandoned).

TECHNICAL FIELD

This invention relates to methods and apparatus for providing competitive, local and toll service in a national telecommunications network.

Problem

The U.S. telecommunications network is in a state of transition. During the next several years, it is expected that the monopoly held by local exchange carriers will be substantially altered and that Competitive Access Providers (CAPs) will begin to offer customer access for toll calls to the already competitive interexchange carriers, will provide local exchange service, or both. In order to accomplish this goal without creating an excessive burden on customers who wish to receive service from a CAP, it is expected that there will be a requirement that a change to a CAP need not be accompanied by a change of telephone number. Further in the long run, it is expected that customers will be able to move to another geographic location within some reasonably defined region, and, in moving, change their local carrier, the switch from which they are being served, or both. The ability to change service providers without moving is called service provider number portability; the ability to change location without changing a service provider is called geographic number or location portability. It is expected that in the not too distant future both will be required. In order to provide service in the face of service provider number portability and geographic number portability, the traditional tie between a customer's serving central office and the NPA-NXX portion of that customer's telephone number will have to be broken and alternate arrangements provided. Such alternate arrangements already exist for 700 service wherein the last seven digits of a 700 number bear no relation to the geographic location of the associated telephone customer. Other service access codes such as 500 are being planned for use with similar services. At the present time, this type of facility is limited to a small fraction of telephone customers. Accordingly, the problem in the prior art is that no sound economic arrangement has been proposed which offers geographic number portability and service provider number portability to most telephone customers.

Solution

The above problem is solved and an advance is made over the prior art in accordance with our invention wherein each local exchange carrier is provided with access to a local universal database listing all numbers for a given local region served by a local exchange carrier and wherein each interexchange carrier is provided with access to a national database listing all numbers for the nation. (Clearly, both of these databases can be implemented incrementally during a period of transition wherein for example, the national database need only store data for regions which have implemented service provider number portability and/or geographic number portability and within these regions only for office codes which have diversity in the location and/or the local exchange carrier of their subscribers.) For local calls, the local database is accessed to determine the identity of the terminating local exchange carrier and the terminating switch of the called customer while the national database is accessed to obtain similar information for toll calls. Advantageously, with this arrangement, the originating switch or a switch of an interexchange carrier can determine the identity of the local carrier serving the called customer and the switch from which that called customer is served.

In accordance with one feature of the invention, an alternate terminating carrier and terminating switch can be identified for customers who require especially reliable service so that if the preferred carrier and switch are inaccessible, the terminating customer may be reached by an alternate route. In accordance with another aspect of the invention, call detail records for individual calls include the identity of the terminating exchange carrier and switch for toll calls. The originating local carrier and switch must also be identified if the interexchange carrier is to produce the billing record for a call, in order to rate calls properly with geographic and/or service provider portability.

For local carrier switches for local or toll calls, the identity of the originating local exchange carrier and switch, or the interexchange carrier, respectively, can be optionally recorded in order to allow a single billing center to process calls from a plurality of carriers without requiring that the records of each carrier and switch be segregated.

In order to route calls in a network which has local number portability, it is necessary to have a location routing number for routing calls to the particular switch which serves the called customer. Such a location routing number is used to identify that switch so that the call may be routed there. In accordance with one feature of applicants' invention, this location routing number (LRN) comprises an area code and office code (NPA-NXX) wherein each switch of the network has a unique LRN. If a switch serves customers having several different office codes, perhaps even office codes and having different NPA codes, such a switch is identified by a single NPA-NXX code. While it may be convenient to assign an NPA-NXX code that is used by at least some of the customers served by switch, it is not necessary; because each switch must have a distinct location routing number, it may not be possible, in some cases, for some of the switches, especially smaller switches of competitive access providers. However, if the switch is identified by an NPA-NXX code of some of the telephones that it serves, routing translations can remain the same for those telephones. Advantageously, the use of an NPA-NXX code as a location routing number provides a high degree of compatibility with existing methods of routing telephone calls.

DRAWING DESCRIPTION

DETAILED DESCRIPTION

Figure 1:
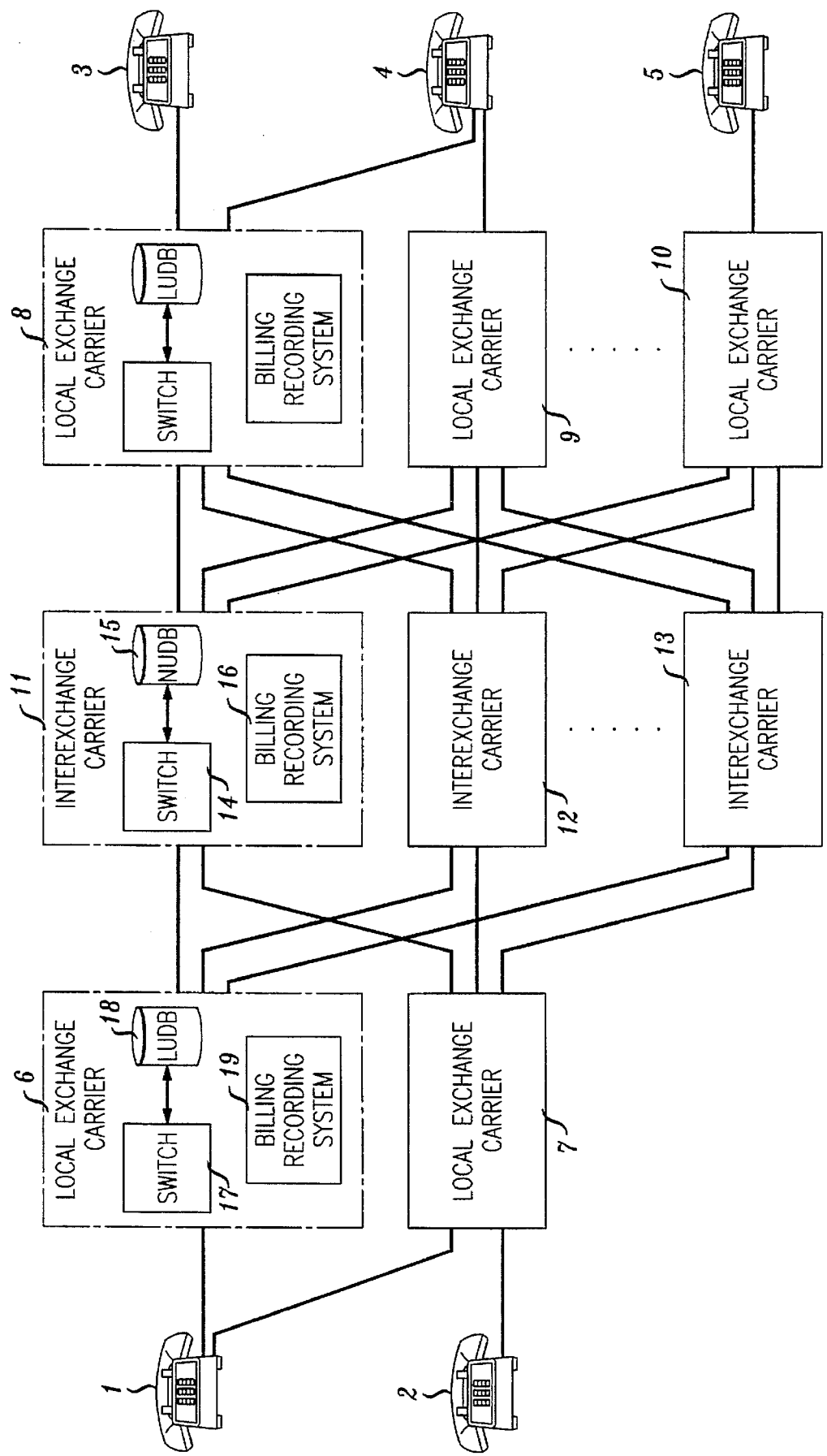
FIG. 1 is an overall block diagram illustrating the operation of applicant's invention.

FIG. 1 is a block diagram showing the relationship between telephone customers, local service providers (i.e., local exchange carriers) and interexchange carriers. Individual customers 1–5 serve to originate or terminate telephone traffic. Some of these customers, such as customers 1 and 4, are connected to two carriers in order to provide especially reliable service. Local exchange carriers 6–10 are connected to the customers and are connected to interexchange carriers 11–13. Each local exchange carrier includes one or more switches 17, a local universal database (LUDB) 18 and a billing recording system 19. Alternatively, a local universal database can be shared by several or all local carriers. The switches are for establishing telephone connections in the conventional way and are interconnected by the links shown in FIG. 1. The database 18 need only contain data for the telephone numbers of the region served by the local exchange carrier. Each of the local exchange carriers serving a particular region stores in its database data concerning all the numbers of the region so that in a broad sense, each of the databases contain the same data. The database for a particular region and a particular carrier is accessed through data links from each of the switches of the carrier serving that region. While FIG. 1 shows individual databases for each local exchange carrier, these databases could be shared among a plurality of such local exchange carriers; this is particularly straightforward since the databases are accessed using data links.

The local exchange carriers are connected to interexchange carriers 11, 12, . . . , 13, each of which contains one or more switches 14, and access to a national universal database (NUDB) 15 and a billing record system 16. The remarks made previously about the local database are also applied to the national database which, of course, is very much larger. This national database can be concentrated or distributed and can be shared among a plurality of interexchange carriers since it is accessed by data links from the switches that use the data of the database.

Figure 2:
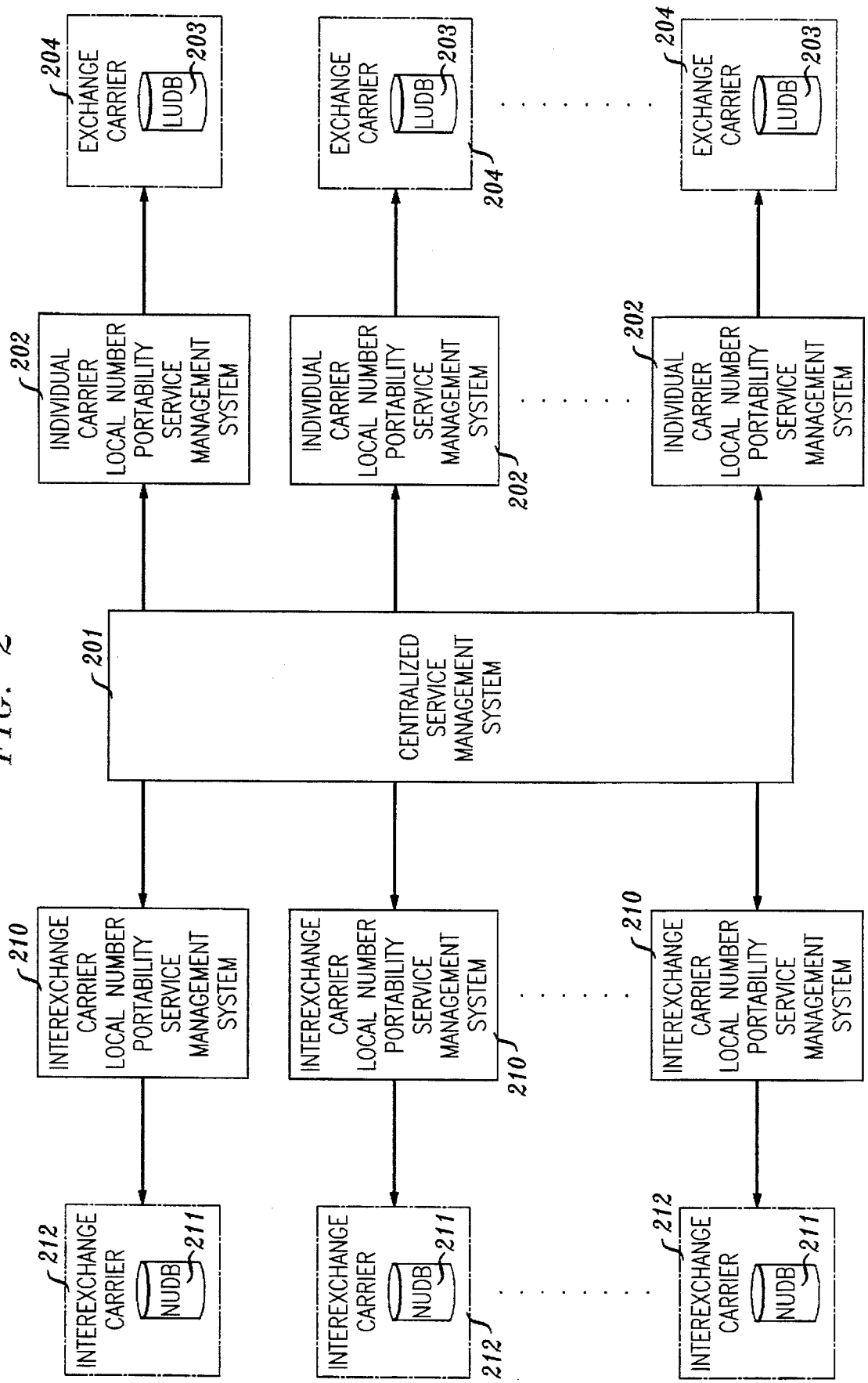
FIG. 2 is a block diagram illustrating the arrangement for updating national and local databases.

FIG. 2 shows an arrangement for updating the local and national databases. A centralized service management system 201 transmits update messages to individual carrier local number portability service management systems 202 which transmit update messages to the local databases 203 of each of the carriers 204. Similarly, the centralized service management system 201 transmits data messages to interexchange carrier local number portability service management systems 210, each of which are used to update the national databases 211 of each of the carriers 212.

Local access providers must provide update information to the centralized service management system 201. The customer's new local service provider is responsible for the update for the case in which the customer changes service providers. When a customer switches carriers, the original local carrier may be required to forward calls for a short period (a few days) until the database has been updated.

Figure 3:
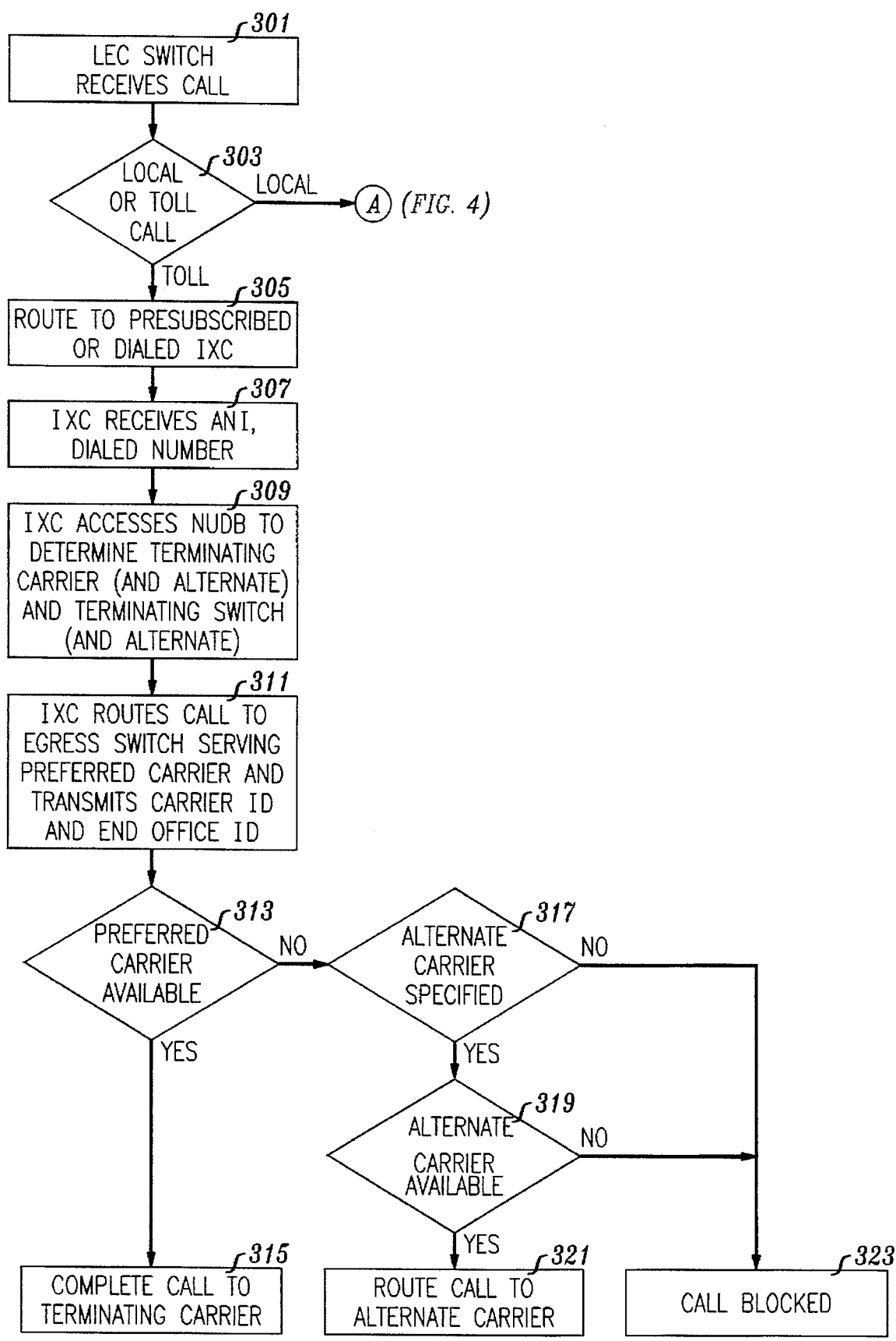
FIGS. 3–6 are flow diagrams illustrating the operation of applicant's invention.

FIG. 3 is a flowchart of the routing procedure for this kind of arrangement. The local exchange carrier switch receives the call (action block 301). The local carrier switch makes a translation whether this is a local or a toll call (test 303). If geographic number (location) portability has been implemented in the region where the call is received, then in order to successfully complete test 303, the local database will return the preferred terminating local exchange carrier and the switch from which the terminating customer is served and this can be used in conjunction with the identification of the originating switch to determine whether this is a local or toll call. A call will also be a toll call if it is recognized that the local database will not contain data for that terminating customer. This can be determined, for example, from the NPA code of the terminating customer, or if geographic number (location) portability has not been implemented from the office code of the called number. If as a result of test 303 it is determined that this is a toll call, then the call is routed to the pre-subscribed interexchange carrier or if the customer specifies an interexchange carrier by dialing an appropriate code, then to the specified dialed interexchange carrier (see action block 305). The interexchange carrier receives the Automatic Number Identification (ANI) of the calling customer, and the Dialed Number (action block 307). The interexchange carrier then accesses the national database to determine the terminating carrier (and alternate where provided) and the terminating switch (and alternate where specified) (action block 309). The interexchange carrier then routes the call to an egress switch serving the preferred terminating carrier and transmits the terminating carrier and local office identification (action block 311). Test 313 determines whether the preferred carrier is available; if so, the call is completed to the called customer via that terminating carrier (action block 315). If the preferred carrier is not available (negative result of test 313), then test 317 determines whether an alternate carrier has been specified. If so, then test 319 determines whether the alternate carrier is available. If so, the call is routed to the alternate carrier for completion to the called customer (action block 321). If the alternate carrier is unavailable, then the call is blocked and given blocked call treatment (action block 323). Similarly, if no alternate carrier had been specified (negative result of test 317) then the call is also blocked (action block 323).

Figure 4:
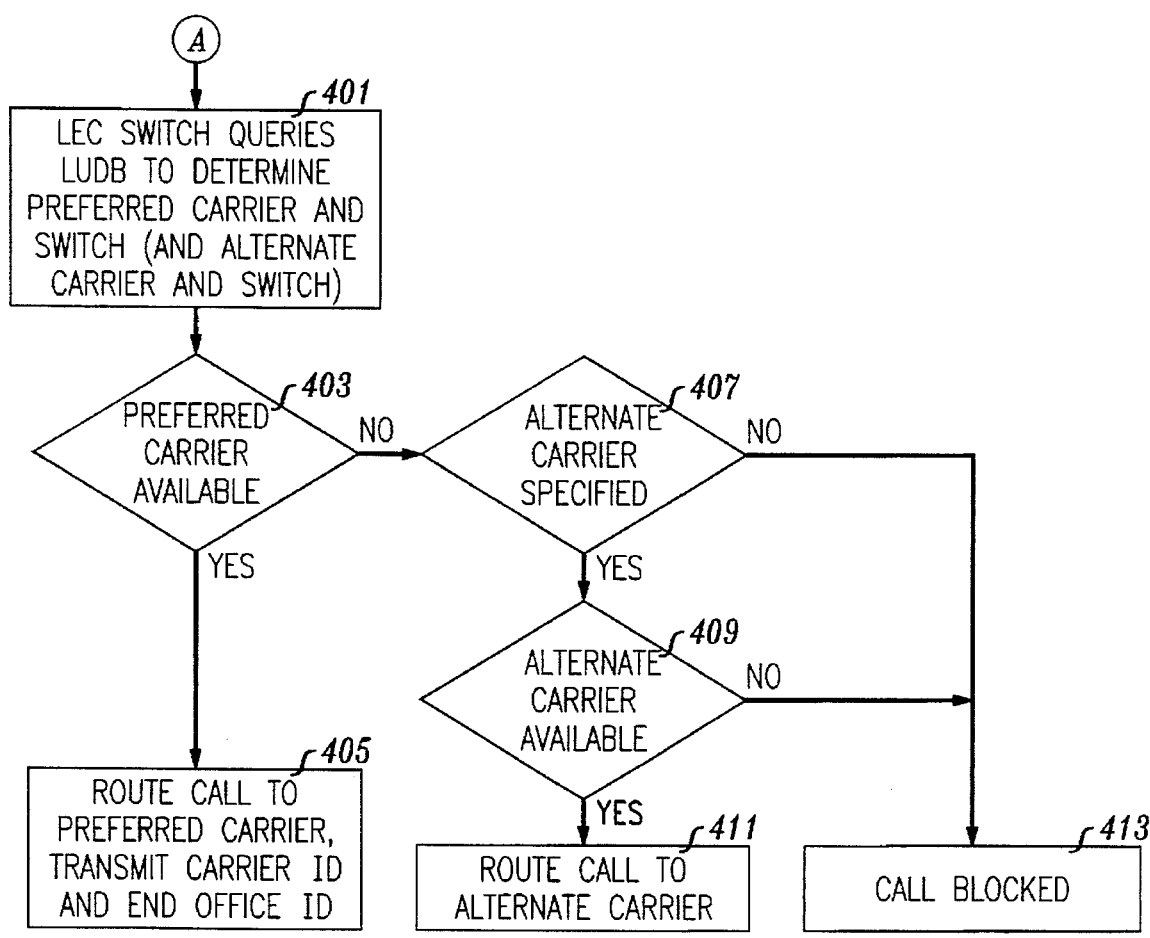

If the result of test 303 for determining whether this is a local or toll call is that the call is a local call, then action block 401 (FIG. 4) is entered. In action block 401 the local exchange carrier switch queries the local database to determine the preferred carrier and switch (and alternate carrier and switch if so specified). Test 403 is used to determine whether the preferred carrier is available. If so, then the call is routed to the preferred carrier, and the terminating carrier and end office identification are transmitted toward the terminating carrier (action block 405). If not, test 407 determines whether an alternate carrier has been specified. If so, test 409 determines whether the alternate carrier is available. If so, then the call is routed to the alternate carrier for completion to the called customer. If the alternate carrier is not available (negative result of test 409) or if no alternate carrier had been specified (negative result of test 407) then the call is given blocked call treatment (action block 413).

Figure 5:
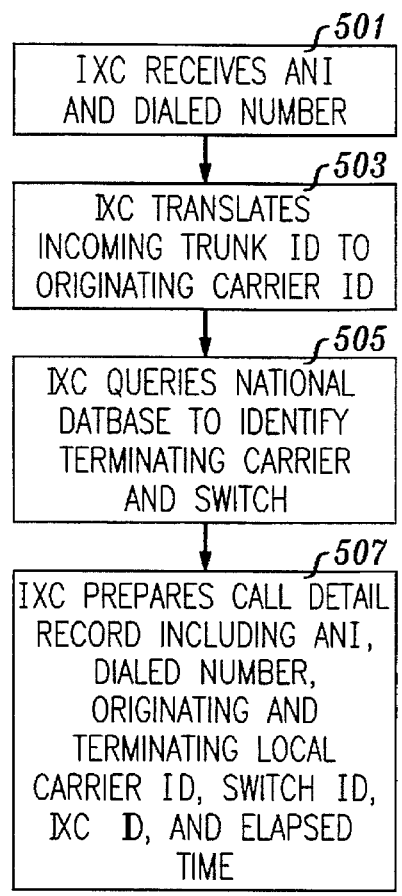

FIG. 5 is a flow diagram showing the actions performed for billing a toll call. The interexchange carrier receives the ANI and Dialed Number (action block 501). The interexchange carrier translates the incoming trunk identification to identify the originating carrier (action block 503). Alternatively, signaling information from the originating carrier can identify that carrier. The interexchange carrier then queries the national database to identify the terminating carrier and switch for the called number (action block 505) and the interexchange carrier prepares a call detail record including the ANI, Dialed Number, originating and terminating local carrier identification and switch identification, the interexchange carrier identity (in case billing records are processed for several carriers by a single processor), and elapsed time for the call (action block 507).

Figure 6:
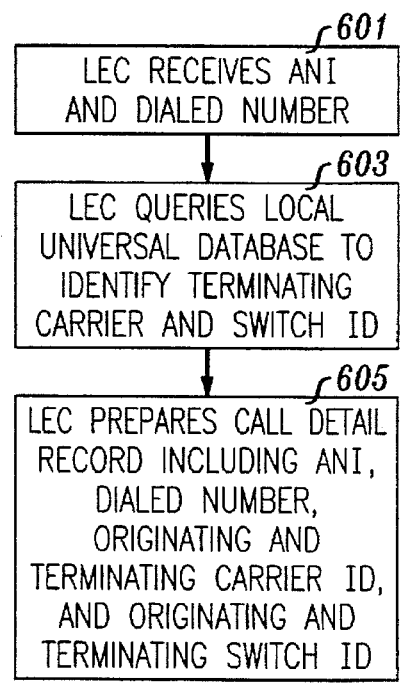

FIG. 6 is the billing procedure for local calls. The local carrier receives the Dialed Number and the ANI of the originating customer (action block 601). The local carrier then queries the local database to identify the terminating carrier and switch based on the Dialed Number (action block 603). The local carrier then prepares a call detail record including the ANI, Dialed Number, the terminating carrier and terminating switch identification.

For the case that the alternate terminating carrier is used, the alternate terminating carrier and switch are substituted for the preferred carrier and switch in the call detail record.

Figure 7:
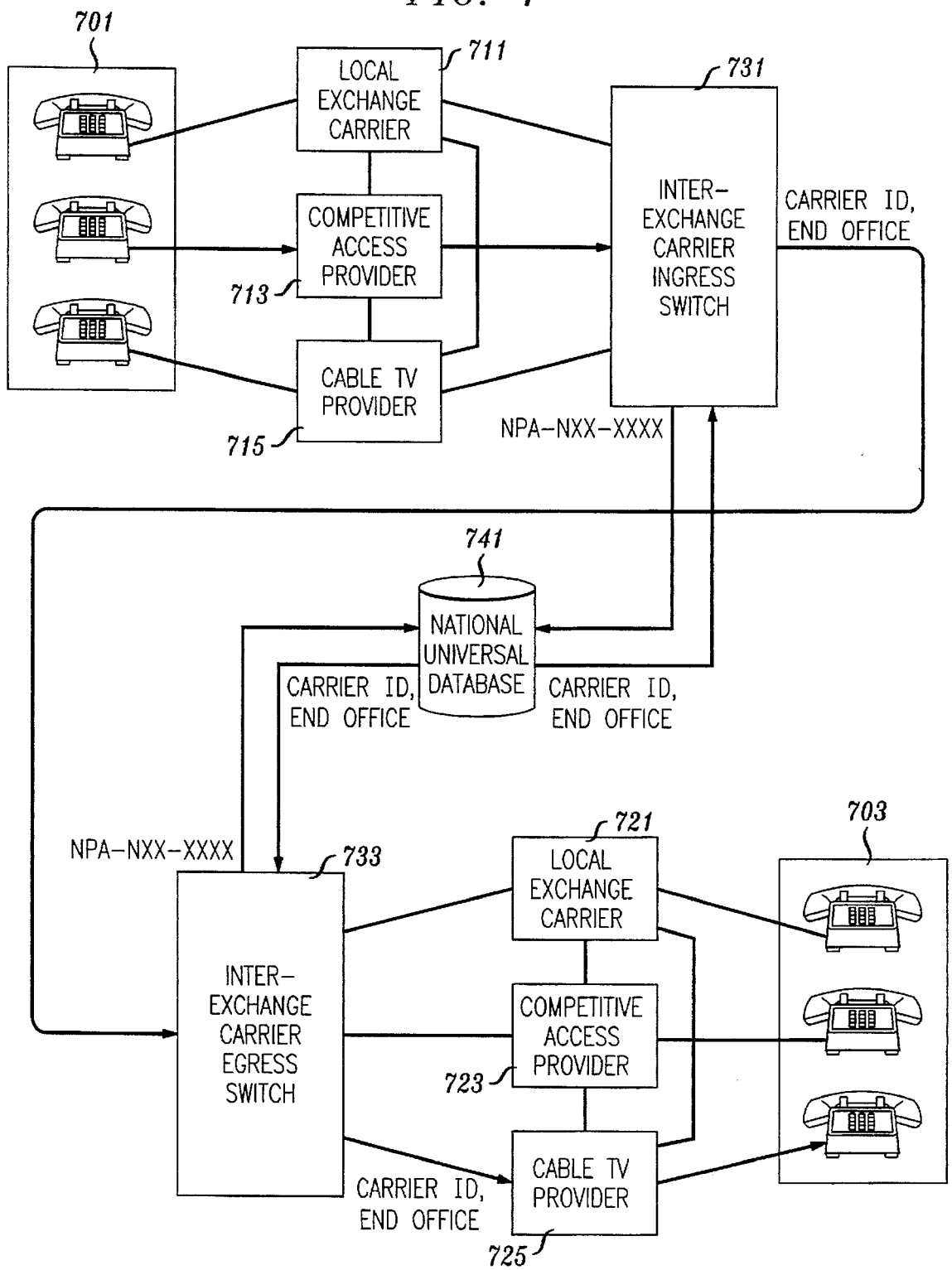
FIGS. 7 and 8 are diagrams illustrating the establishment of toll and local calls in accordance with applicant's invention.

FIG. 7 illustrates a toll call and illustrates some of the ways in which the arrangement described herein has flexibility. A customer 701 has access to three different local carriers: namely, Local Exchange Carrier 711, Competitive Access Provider 713 and Cable TV provider 715. Assume that this customer elects for a particular call to use the Competitive Access Provider 713. When the toll call arrives at the ingress switch 731 of the selected interexchange carrier, the call is routed to the egress switch of interexchange carrier 733, either the ingress switch or the egress switch may query a national universal database 741 to obtain information as to the carrier and office serving the called customer. The interexchange carrier switch querying database 741 supplies the called party number (NPA-NXX-XXXX) and receives in response the identity or identities of the carrier(s) and end office(s) of the local carrier serving the called customer. It is also possible that the database is queried from an intermediate switch of the selected interexchange carrier; this might happen, for example, if the call is of a special type handled by a specialist interexchange carrier switch. At any rate, the egress switch is informed, either by the querying switch, or directly by the database if the egress switch is the querying switch, of the identity of the preferred carrier(s) and the identity of the end office for each such carrier. The call is then routed, in this case via CATV carrier 725, to the terminating customer. Note that in the terminating region there is also a Local Exchange Carrier 721 and the Competitive Access Provider 723, so that there is an alternative for completing the call to the called customer 703. In order to provide revenue to the carrier that actually processed the call, the identity of the originating and terminating local carrier, as well as the interexchange carrier, are provided either explicitly to the call detail records or implicitly because the record is made by a particular carrier.

Figure 8:
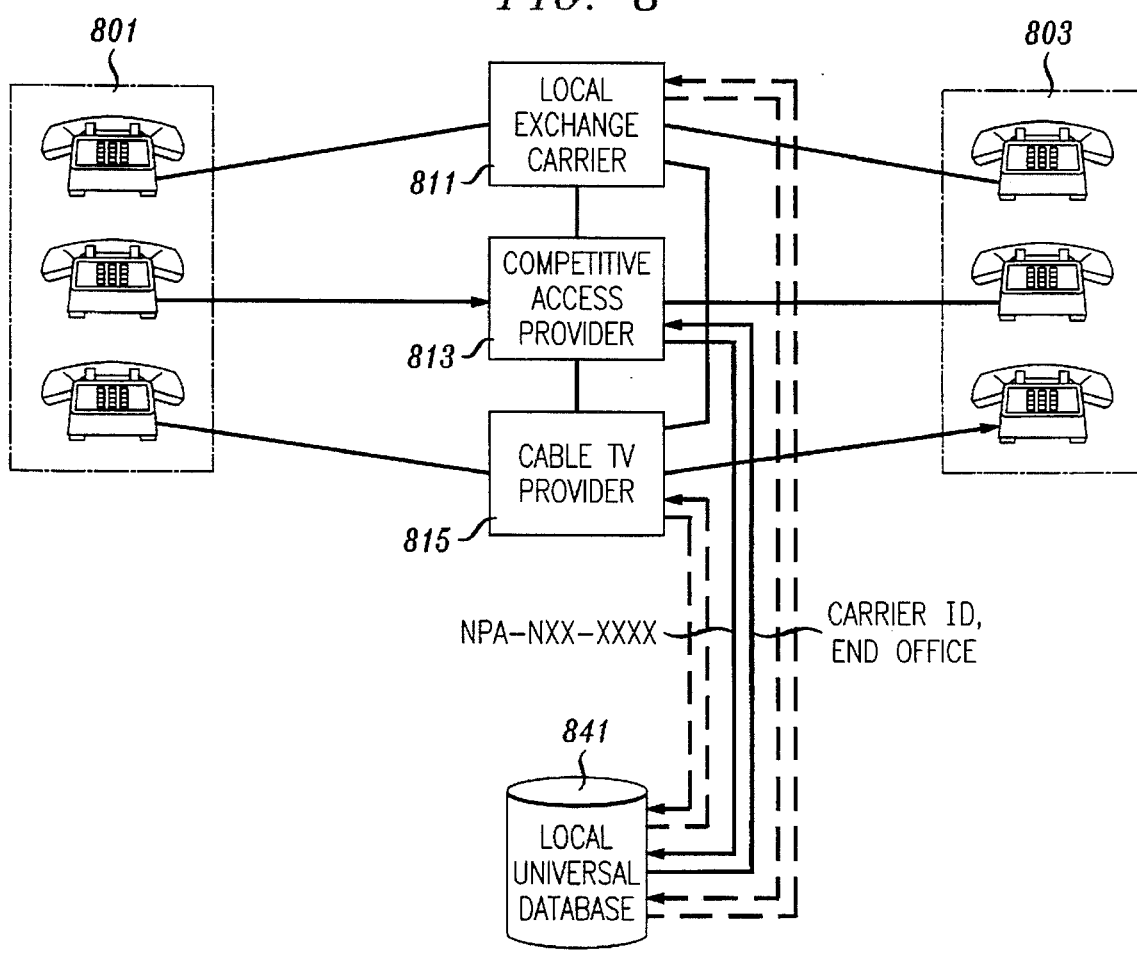

FIG. 8 illustrates a local call and illustrates some of the ways in which the arrangement described herein has flexibility. A customer 801 has access to three different local carriers, namely local exchange carrier 811, Competitive Access Provider 813 and Cable TV provider 815. Assume that this customer elects for a particular call to use the Competitive Access Provider 813. When the local call arrives at a switch at Competitive Access Provider 813, the switch from the Competitive Access Provider 813 accesses local universal database 841 with the dialed number (NPA-NXX-XXXX) and receives in response the identity or identities of the carrier(s) and end office(s) of the local carrier serving the called customer. The Competitive Access Provider then routes the call via the preferred carrier which may be local exchange carrier 811 or Cable TV provider 815. Note that in the particular case where illustrated in the diagram wherein called customer 803 has access to all three carriers, the call can be routed via a non-preferred carrier if access via the preferred terminating carrier is blocked. In order to provide revenue to the carrier that actually processed the call, the identity of the originating and terminating local carrier are provided either explicitly to the call detail record or implicitly because the record is made by a particular carrier.

While in the preferred embodiment, the interexchange carrier accesses the national database, the originating carrier can alternatively be arranged to access that database and forward the identity of the terminating carrier(s) and switch(es) to the interexchange carrier.

For a local operator assistance call, the local carrier determines that the call is a local operator call and sends the call to a local operator assistance system which may be part of the calling party's local carrier network, or in another local network (operator systems can serve multiple local networks). The originating local carrier is identified to the operator system either by incoming trunk information or signaling. The operator system performs the requested operator service and then queries the LUDB to get the terminating carrier and terminating switch. It routes the call to the terminating carrier, passing the carrier and switch identification. The operator system makes a call detail record that includes both the originating and terminating, carrier and switch, identifications.

For a toll operator call, the local carrier determines that the call is a toll operator call and sends the call to the subscribed or dialed toll carrier operator system. The originating local carrier is identified to the toll operator assistance system either by incoming trunk information or signaling. The operator system performs the requested operator service and routes the call to a toll ingress switch. >From here, routing is the same as a toll call—the ingress toll switch queries the NUDB, etc. When the toll call is successfully routed, the terminating carrier and switch identifications are signaled in the backwards direction to the operator system to be included in the call detail record.

Essential to the implementation of Local Number Portability (LNP) is the ability to associate a network destination with a ported dialed number. This information, identified as a Location Routing Number or LRN, will necessarily indicate the specific switching entity which serves the called party and, therefore, to which the call must be routed. Clearly, the LRN will be the key element in the LNP database.

An LRN must be selected for each switching entity which terminates subscriber lines. Although LNP, and in particular, the use of an LRN will significantly impact call processing in all networks, the format of the LRN can be selected to minimize the required network changes. Specifically, it would be desirable if the use of the LRN:

allowed the continued use of current network routing methods permitted the use of existing signaling protocols avoided the need for new technical standards Any number of formats might be considered for use as an LRN. For example, a simple 5 digit numeric code would allow the unique identity of up to 100,000 end offices. Alternatively, the code could be designed to include routing information indicating, for example, a region of the country in which the end office was located; or the code could be designed to include the identity of the local service provider. All of these suggestions, however, fail to satisfy the most important of the above mentioned criteria—the need to retain the current routing algorithms in all network switches. Today, routing is based upon the geographic information contained in North American Numbering Plan (NANP) numbers—specifically the first six digits of those numbers or NPA-NXX. Accordingly, the use of an LRN in a format other than NPA-NXX would create the need to develop routing based upon the new code. It appears appropriate, therefore, that the LRN retain the format of the numbering plan used to identify end offices today; that is, NPA-NXX.

In accordance with applicants' teachings, a unique LRN, in the form of NPA-NXX, is assigned to each switching entity which terminates subscriber lines. The LRNs are assigned by a code administrator, likely the same administrator responsible for local number administration. Existing end offices which are presently associated with one or more NPA-NXXs, would select one of the NPA-NXXs currently assigned to the office as the LRN. Local service providers establishing new switching entities would, naturally, request and receive an LRN from the administrator. An LRN need not contain the NPA-NXX code of any customer served by the switch identified by the LRN.

To avoid routing complexities it is important that an LRN assigned to any end office not be an NPA-NXX assigned to any other end office. For example, consider a large end office which currently uses four NPA-NXXs to identify customers served from that office. One of the four NPA-NXXs would be selected as the LRN for that office. The LRN for any other end office should not be selected from any of the three (non-LRN) codes assigned to the existing end office. This constraint eliminates the need to establish separate routing tables—or domains—to distinguish routing based upon LRNs—for those dialed numbers that have been ported—from routing based on the dialed number for those numbers that have not been ported. Rather, routing tables as they exist today, would be used to effect call completion. Finally, it is assumed that information associated with LRNs, such as service provider name, common location language identifier (CLLI) code, tandem routes, vertical and horizontal graphics coordinates, etc., would be added to the Local Exchange Routing Guide (LERG).

Equally important in the selection and use of an LRN is its compatibility with the existing signaling methods used to transmit the necessary address information required for proper call completion. Signaling messages are necessary to provide this information either directly to the terminating switch or to an intermediate or tandem office. It will be necessary to carry both the LRN as well as the dialed number (DN) along the signaling path. The LRN is clearly required for call routing and the DN is needed by the serving end office to effect the connection to the loop assigned to the called party. The following describes the methodology through which existing signaling methods can be used to forward this information.

Typically, signaling information is carried over a dedicated, common channel signaling network using the SS7 protocol. Call set-up is effected using an initial address message (IAM) which contains several parameters, each containing specific information related to the call. This signaling method is used to provide call completion in a number portable environment by simply modifying the use of existing parameters. Although the modification of the use of these parameters requires industry agreement on the addition of new codes to existing signaling parameters, it should not involve the more complex and time consuming exercise of establishing and implementing the use of an entirely new signaling parameter within the SS7 message.

Specifically, the SS7 IAM parameters that are involved are the called party number (CdPN) parameter and the Generic Address Parameter (GAP). Today, for non-featured calls the CdPN parameter is populated with the DN and call routing is performed using this number. (A non-featured call is one whose dialed directory number is used for routing the call, in contrast, for example, to 800 calls wherein the dialed number cannot be used directly for routing.) The GAP is an optional parameter designated to transport a "user provided number" and is currently used in only a few instances. It is proposed that when a ported call is processed and an LRN is received as a response from an LNP database, the LRN is populated in the CdPN parameter of the IAM. It is further proposed that the DN be transmitted in the GAP. The contents of the CdPN parameter (the LRN) will be used as necessary to route the call. Because the information is in the NPA-NXX format, routing should proceed without change. At the terminating end office the 6 digit format of the LRN can be identified by the switch to indicate a call for completion to a ported number. With that identification, the switch can be instructed to locate the number originally dialed— and necessary to identify the called party—in the GAP.

Figure 9:
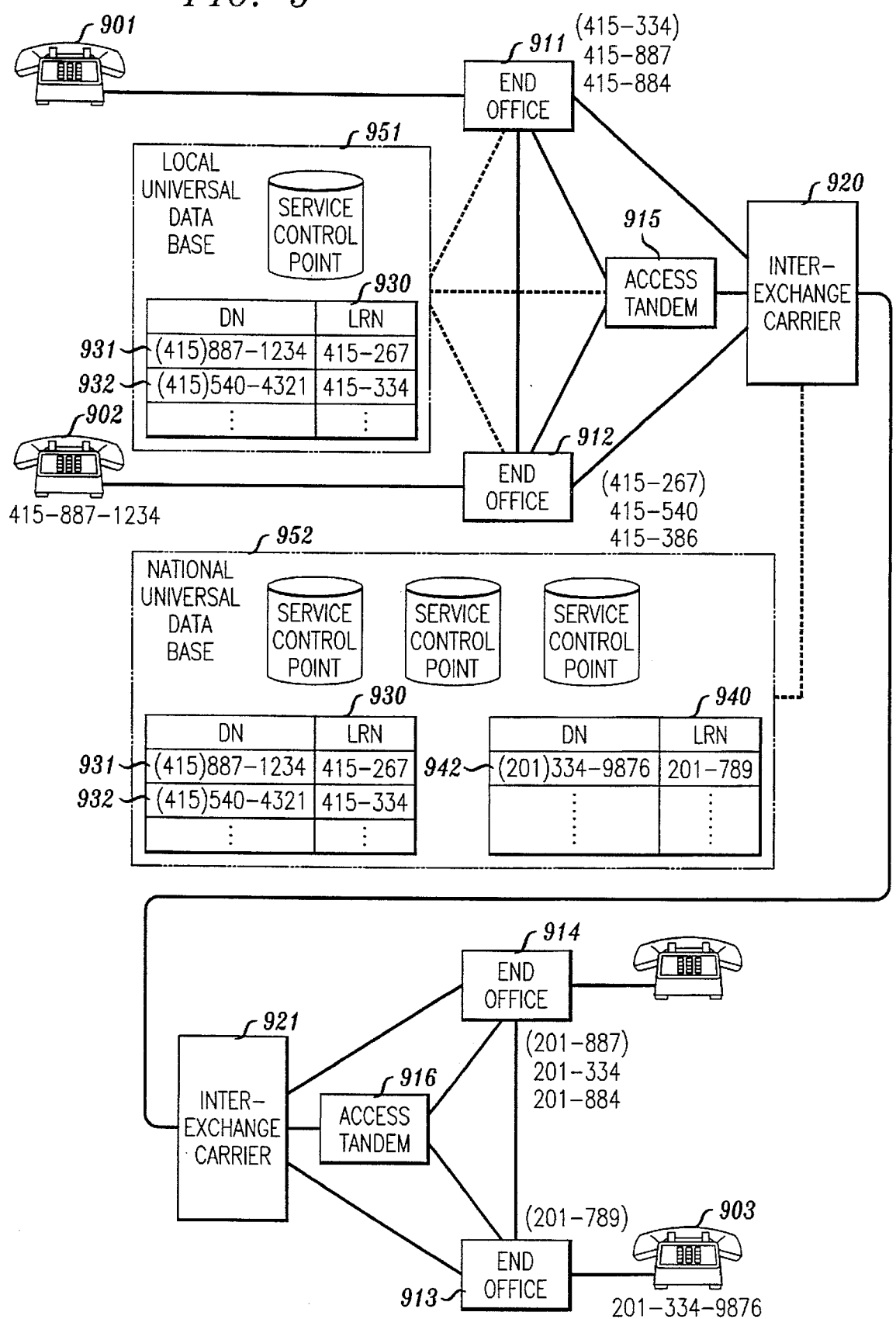
FIG. 9 illustrates the use of data for identifying a location reference number for routing calls.

FIG. 9 illustrates the operation of applicant's invention with respect to the use of a location routing number. Telephones 901, 902, and 903 are connected to end offices 911, 912, and 913, respectively. End offices 911, and 912 are in the same local region, whereas, end office 913 is connected to end offices 911, and 912 via trunks interconnecting interexchange carrier offices 920 and 921. Access tandems 915 and 916 are used for accessing the interexchange carrier and for interconnecting the end offices to databases as shown as local universal database 951 and a national universal database 952. For each end office, a set of office codes served by that office is shown. The particular office code which is also used as the location routing number is shown in parentheses.

In the particular example shown, telephone station 415-887-1234 is connected to end office 912 having location routing number 415-267. End office 911 serves the bulk of the telephones having telephone numbers in the 415-887 office code. When telephone 901 calls telephone 902 having telephone number 415-887-1234, a check is made in local universal database 951, table 930, and an entry 931 is found, indicating that telephone 415-887-1234 is served by an end office identified by location routing number 415-267, i.e., end office 912. If no entry had been found for telephone 415-887-1234, then the call would have been routed using the 415-887 code to end office 911.

If telephone 901 calls telephone 903 having telephone number 201-334-9876, such a call is identified as being an inter-LATA (interlocal access transport area) routed to an interexchange carrier which accesses a national universal database in order to find the identity of the switch serving the terminating telephone. It is necessary to identify this switch in order to route via an exchange carrier that serves the identified switch. The national universal database 952 has an entry 942 in table 940 for telephone number 201-334-9876 and that entry indicates that the location routing number of the terminating end office is 201-789. If no entry had been found, then the 201-334 office code would have been used to route the call to end office 914 which serves the bulk of the 201-334 office code traffic.

Note that the databases need only store data for the numbers that are not served by the local switches serving the bulk of the numbers of a particular office code. Data need only be stored for the numbers of customers who have moved from such a switch to another.

Consider the toll call associated with FIG. 9 in more detail.

1. An interLATA call is generated by an end user in California to a called party in New Jersey. The dialed number is (201) 334-9876.
2. The call is recognized by the originating end office as an interLATA call and the call is forwarded to the presubscribed interexchange carrier (IC).
3. Although the IC could test to identify the DN at either the originating or terminating switch in its network assume the identification is performed at the originating IC switch. Specifically, the first 6 digits (201-334) of the DN are analyzed and identified as a potentially ported number.
4. Database query is launched to the appropriate NUDB database with the DN (201) 334-9876.

5. Because the number has been ported, the response from the NUDB database includes the LRN (201-789).
6. The call is routed based upon the LRN and the originating IC switch formulates an SS7 IAM (initial address message).
7. The CdPN parameter is populated with the LRN (201-789) and the DN (201) 334-9876 is inserted in the GAP.
8. The terminating IC switch routes the call based upon the LRN and generates a signaling message to the designated end office.
9. If the terminating end office is SS7 and "LNP capable" (LNP=Local Number Portability) (i.e. capable of recognizing the modified signaling message):
    End office checks contents of CdPN parameter, recognizes the 6 digit format and identifies the call as an "LNP" call.
    End office uses the information in the GAP (the DN) to route the call to the appropriate subscriber loop.
10. If the terminating end office is not LNP capable, the (n−1)st switch (i.e., the switch transmitting the signaling message) must format the signaling message so that the DN is contained in the CdPN parameter.
11. Similarly, if the EO is not SS7 compatible, the DN will be forwarded using in-band (MF) signaling.
12. If the dialed number has not been ported, the call is routed and signaling generated in the normal manner.
    The dialed number is populated in the CdPN parameter
    The GAP is not used
    The call is routed based upon the DN contained in the CdPN parameter.

In some cases, an end office switch may serve more than one carrier, with different sets of customers, associated with different sets, telephone numbers, being served by different carriers. Under these circumstances, different trunk groups are likely to be used for the calls of the different carriers. The routing arrangement must be capable of selecting these carriers. Therefore, it is necessary to have the translations in the LUDB 951 and NUDB 952 augmented with the identities of the trunk groups or a routing index for finding such trunk groups. As shown in FIG. 5, such carriers must be identified for routing and entered in billing records.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. In a telecommunication network, a method of establishing a telecommunications call, comprising the steps of:
    receiving a Dialed Number dialed by a caller at a first switch of a first local carrier;
    determining whether said Dialed Number is for a local exchange area call;
    if it is determined that said Dialed Number is for a local exchange area call, accessing a local database to determine a preferred terminating carrier, prespecified by a called party identified by said Dialed Number, and switch prespecified by said preferred terminating carrier for serving said call; and
    routing said call to said preferred terminating carrier for completing said call to said switch.

2. The method of claim 1 wherein the step of accessing the local database comprises the step of
    accessing said local database to determine a preferred terminating and an alternate terminating carrier for said local exchange area and preferred and alternate switch prespecified by said preferred terminating and said alternate terminating carrier, respectively, for serving said call; and
    wherein the step of routing said call further comprises the step of routing said call to said alternate carrier if said preferred carrier is not available.

3. The method of claim 1 or claim 2 further comprising the step of:
    preparing a call detail record for said call, said billing record comprising an identity of a terminating carrier selected for routing said call.

4. The method of claim 1 further comprising the step of:
    determining whether this is a local exchange area toll call;
    responsive to a determination that this is a local exchange area toll call, determining whether the caller has subscribed to or specified an interexchange carrier for local exchange area toll calls; and
    responsive to a determination that the caller has subscribed to or specified an interexchange carrier for local exchange area toll calls, routing said call to the subscribed to or specified interexchange carrier for a determination of the terminating carrier and switch serving the called party specified by the Dialed Number.

5. The method of claim 1 further comprising the step of:
    determining whether this is an interexchange call responsive to determining that said Dialed Number is for an interexchange call, querying a national database to determine a terminating carrier and switch for serving said Dialed Number.

6. The method of claim 5 wherein said national database is accessed by an interexchange carrier.

7. The method of claim 5 wherein said national database is accessed by said first local carrier.

8. The method of claim 1 wherein said local database comprises a plurality of databases.

9. The method of claim 8 wherein different terminating carriers use different ones of said plurality of databases.

10. The method of claim 9 wherein databases of a carrier are updated from a centralized service management system.

11. In a telecommunication network, a method of establishing a telecommunications call, comprising the steps of:
    receiving a Dialed Number dialed by a caller at a first switch of a first local carrier;
    determining whether said Dialed Number is for an interexchange call;
    if it is determined that said Dialed Number is for an interexchange call, routing said call to an interexchange carrier;
    accessing a national database from said interexchange carrier to determine a preferred terminating local carrier prespecified by a called party identified by said Dialed Number, and switch prespecified by said preferred terminating carrier for serving said call; and
    routing said call to said preferred terminating local carrier and switch.

12. The method of claim 5 or 11 wherein the step of:
    accessing said national database comprises the step of querying said national database to determine an alternate terminating carrier prespecified by a called party identified by said Dialed Number, and switch prespecified by said alternate terminating earlier for serving said call.

13. The method of claim 5 or 11 further comprising the step of:

preparing a call detail record comprising an identification of said first local carrier and an identification of at least one carrier selected to route said call to the customer identified by the Dialed Number.

14. The method of claim 1 or 11 wherein a national database or a local database comprises a location routing number for routing said telecommunications call to a terminating switch for serving said Dialed Number.

15. The method of claim 14 wherein said location routing number comprises an NPA-NXX (number plan area-office code) code.

16. The method of claim 15 wherein said NPA-NXX code matches an NPA-NXX code of at least some customers served by said terminating switch.

17. The method of claim 14 wherein said national database or regional database further comprises data for identifying a trunk group for routing said telecommunications call over a carrier for serving said called number.

18. The method of claim 5 or 8 wherein said national database comprises a plurality of databases.

* * * * *